(12) United States Patent
Nakanishi et al.

(10) Patent No.: US 8,259,347 B2
(45) Date of Patent: Sep. 4, 2012

(54) IMAGE PROCESSING APPARATUS AND COMPUTER READABLE MEDIUM

(75) Inventors: Shingo Nakanishi, Kanagawa (JP); Hiroyuki Oyabu, Kanagawa (JP); Shunji Tsunashima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 831 days.

(21) Appl. No.: 11/976,291

(22) Filed: Oct. 23, 2007

(65) Prior Publication Data

US 2008/0225345 A1 Sep. 18, 2008

(30) Foreign Application Priority Data

Mar. 15, 2007 (JP) ................................. 2007-066702

(51) Int. Cl.
*H04N 1/40* (2006.01)

(52) U.S. Cl. ........ 358/1.9; 358/1.13; 358/448; 345/422; 345/592

(58) Field of Classification Search .................... 358/1.9, 358/1.13, 1.16, 448; 345/422, 592
See application file for complete search history.

(56) References Cited

U.S. PATENT DOCUMENTS

| | | | | |
|---|---|---|---|---|
| 4,089,589 A | * | 5/1978 | Brockman et al. | 359/560 |
| 5,388,204 A | * | 2/1995 | Ikeda et al. | 345/538 |
| 5,467,442 A | * | 11/1995 | Tsubota et al. | 345/639 |
| 5,548,696 A | * | 8/1996 | Kubota et al. | 345/639 |
| 5,615,282 A | * | 3/1997 | Spiegel et al. | 382/167 |
| 5,630,105 A | * | 5/1997 | Itagaki | 345/501 |
| 5,778,190 A | * | 7/1998 | Agarwal | 709/247 |
| 6,441,919 B1 | * | 8/2002 | Parker et al. | 358/1.18 |
| 2001/0014175 A1 | * | 8/2001 | Tavor | 382/167 |
| 2004/0091162 A1 | * | 5/2004 | Donahue et al. | 382/245 |
| 2005/0122427 A1 | * | 6/2005 | Hougui et al. | 348/453 |
| 2006/0279758 A1 | * | 12/2006 | Myoki | 358/1.13 |
| 2007/0019882 A1 | * | 1/2007 | Tanaka et al. | 382/276 |

FOREIGN PATENT DOCUMENTS

| | | |
|---|---|---|
| JP | A-07-028986 | 1/1995 |
| JP | A-10-020849 | 1/1998 |
| JP | B2-2768327 | 6/1998 |
| JP | 2001309190 A * | 11/2001 |

OTHER PUBLICATIONS

Japanese Office Action issued in Japanese Patent Application No. 2007-066702 on Jun. 14, 2011 (with translation).

* cited by examiner

*Primary Examiner* — King Poon
*Assistant Examiner* — Allen H Nguyen
(74) *Attorney, Agent, or Firm* — Oliff & Berridge, PLC

(57) ABSTRACT

An image forming apparatus includes: a first holding unit that holds a pixel value data sequence in which each of the data sequences is formed by a pixel value and a range of the pixel value or by the pixel value, the range of the pixel value, reference to a pixel, and a range of the reference; a second holding unit that holds a transparency data sequence in which each of the one-dimensional data sequences is formed by a coefficient representing transparency of a pixel in the image element and a range of the coefficient or by the coefficient, the range of the coefficient, reference to coefficient, and a range of the reference; and an image generation unit that forms an image from the pixel value data sequence, and that generates information about transparency of the image from the transparency data sequence.

10 Claims, 13 Drawing Sheets

FIG. 3A
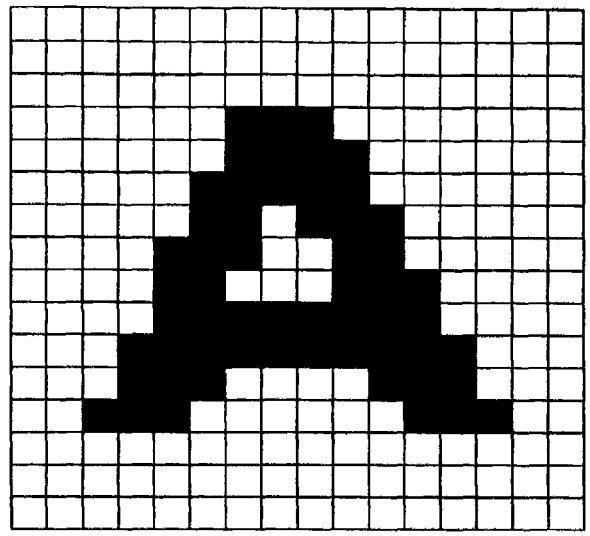
FIG. 3B
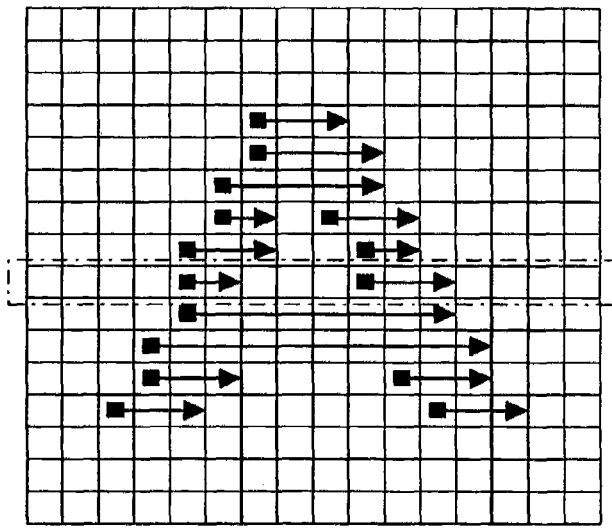
FIG. 3C
| NUMBER OF PIXELS (RUN) | PIXEL VALUE (R/G/B) | ADDITIONAL INFORMATION (ATTRIBUTE) |
|---|---|---|
| 4 | | |
| 2 | (R, G, B) | CHARACTER |
| 3 | | |
| 3 | (R, G, B) | CHARACTER |
| 4 | | |

FIG. 4A
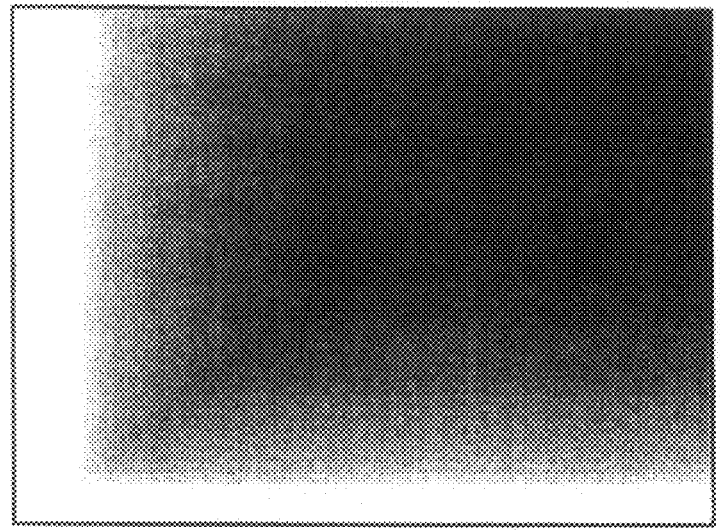
FIG. 4B
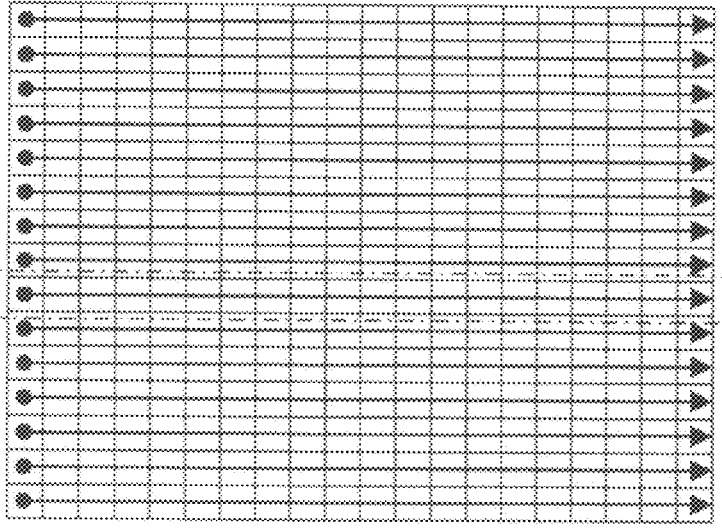
FIG. 4C
| NUMBER OF PIXEL (RUN) | REFERENCE ADDRESS | ADDITIONAL INFORMATION (ATTRIBUTE) |
|---|---|---|
| 20 | ADDRESS | PHOTOGRAPH |

PIXEL VALUE DATA

TRANSPARENCY DATA

FIG. 9A

FIG. 9B

| 901 | 902 | 903 | 904 |
|---|---|---|---|
| CONTINUOUS PIXEL | 6 | PIXEL VALUE (R/G/B) | GRAPHICS |
| PIXEL REFERENCE | 5 | REFERENCE ADDRESS | PHOTOGRAPH |
| PIXEL REFERENCE | 3 | REFERENCE ADDRESS | PHOTOGRAPH |
| CONTINUOUS PIXEL | 3 | PIXEL VALUE (R/G/B) | CHARACTER |
| PIXEL REFERENCE | 2 | REFERENCE ADDRESS | PHOTOGRAPH |
| CONTINUOUS PIXEL | 2 | PIXEL VALUE (R/G/B) | CHARACTER |
| PIXEL REFERENCE | 5 | REFERENCE ADDRESS | PHOTOGRAPH |
| CONTINUOUS PIXEL | 6 | PIXEL VALUE (R/G/B) | GRAPHICS |

FIG. 11

IMAGE PROCESSING APPARATUS AND COMPUTER READABLE MEDIUM

CROSS-REFERENCE TO RELATED APPLICATIONS

This application is based on and claims priority under 35 U.S.C. 119 from Japanese Patent Application No. 2007-066702 filed Mar. 15, 2007.

BACKGROUND

1. Technical Field

The present invention relates to an image processing apparatus which performs alpha blending.

2. Related Art

When a plurality of images are synthesized during image processing, there are occasions where processing called alpha blending for semitransparently synthesizing the images at a mixing ratio set by a coefficient (an alpha value). Alpha blending generally imposes heavy load on a CPU (Central Processing Unit) and involves consumption of a large amount of memory.

SUMMARY

According to an aspect of the present invention, an image forming apparatus including: a first holding unit that holds a pixel value data sequence which represents an image element as an aggregation of one-dimensional data sequences and in which each of the data sequences is formed by a pixel value and a range of the pixel value or by the pixel value, the range of the pixel value, reference to a pixel corresponding to image value arrangement data stored in predetermined data holding unit, and a range of the reference; a second holding unit that holds a transparency data sequence in which each of the one-dimensional data sequences is formed by a coefficient representing transparency of a pixel in the image element and a range of the coefficient or by the coefficient, the range of the coefficient, reference to coefficient corresponding to coefficient arrangement data pertaining to the coefficient held in predetermined data holding unit, and a range of the reference; and an image generation unit that forms an image from the pixel value data sequence held in the first holding unit, and that generates information about transparency of the image from the transparency data sequence held in the second holding unit.

BRIEF DESCRIPTION OF THE DRAWINGS

Exemplary embodiment of the present invention will be described in detail based on the following figures, wherein:

FIGS. 3A to 3C are views for describing run-length encoding operation;

FIGS. 4A to 4C are views for describing a data structure of data of a run length format by reference;

FIGS. 9A and 9B are drawings showing an example configuration of data of a run length format;

FIG. 11 is a view showing an example data configuration of an overall image for one page with regard to transparency (an alpha value);

DETAILED DESCRIPTION

The best mode (hereinafter called an "embodiment") for implementing the present invention will be described in detail hereunder by reference to the accompanying drawings.

Figure 1:
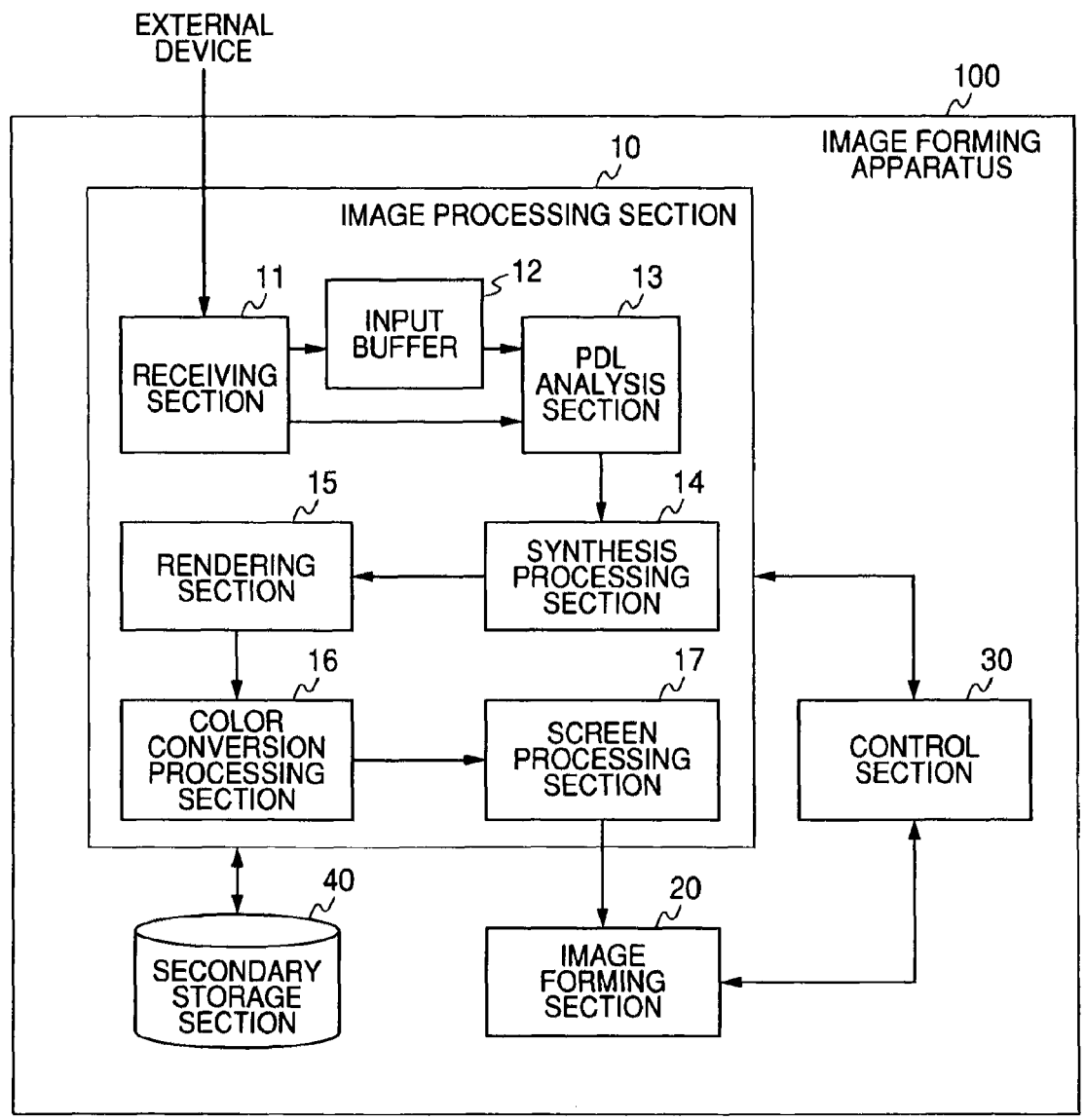
FIG. 1 is a view showing an example configuration of an image forming apparatus to which the embodiment is applied.

FIG. 1 is a view showing an example configuration of an image forming apparatus to which the embodiment is applied.

As shown in FIG. 1, an image forming apparatus 100 of the present embodiment has an image processing section 10; an image forming section 20; a control section 30; and a secondary storage section 40.

The image processing section 10 is a personal computer or image processing unit (an image processing apparatus) which receives data from another external device and which subjects the thus-received data to image processing. The image forming section 20 forms an output image in accordance with data pertaining to color components processed by the image processing section 10. Various schemes; for example, an electrophotographic scheme or an inkjet scheme, may also be used as an image forming scheme of the image forming section 20. The control section 30 controls overall operation of the image forming apparatus 100. The secondary storage section 40 is embodied by; for example, a magnetic disk drive. Programs for processing performed by the image processing section 10 and control operations performed by the control section 30 and various types of data used by these processing and controlling operations are stored in the secondary storage section.

As shown in FIG. 1, the image processing section 10 has a receiving section 11; an input buffer 12; a PDL analysis section 13; a synthesis processing section 14; a rendering processing section 15; a color conversion processing section 16; and a screen processing section 17.

The receiving section 11 receives data pertaining to an output image and a rendering command from an external device, such as a personal computer. The received data are output to the input buffer 12, and the received rendering command is output to the PDL analysis section 13.

The data pertaining to an output image are acquired as data of; e.g., a PDL (Page Description Language) format. The data include; for example, a pixel value, attributes of an image element (an object), and an alpha value used for alpha-blending operation. The pixel value is a value of each pixel expressed in; for example, a predetermined color space, and is represented with; for example, a predetermined gradation. Specifically, the data are data which belong to an sRGB space expressed with each 8-bit (1-byte) gradation on an per-RGB basis, and the like. Here, RGB designates the primary colors of light consisting of R (red), G (green), and B (blue). Moreover, the attributes of an image element (hereinafter simply called "attributes") correspond to information showing the type of an image, such as a "character," a "graphics," a "photograph," and the like. Moreover, the alpha value represents the transparency of a pixel and expresses the degree of transparence by; for example, eight bits (or one byte).

The PDL analysis section 13 reads and analyzes data from the input buffer 12 in accordance with the rendering command received from the receiving section 11, thereby generating object data for; e.g., one print page. The thus-generated data are output to the synthesis processing section 14 along with the rendering command.

The object data express the previously-described pixel elements as an aggregation of sets of data of run length format. Here, the data of run length format include run-length encoded data pertaining to a value, such as a pixel value, and data that describe information about a reference to raster data and a range—to which a reference is to be made—in the same data format of the run-length encoded data. In the present embodiment, pixel value data—which are object data pertaining to pixel values of respective image elements—and transparency data—which are object data pertaining to alpha values of the respective image elements—are generated. These sets of object data in the present embodiment will be described in detail later.

The synthesis processing section 14 synthesizes pixel value data pertaining to respective image elements, and generates pixel value data pertaining to a synthesized image obtained as result of synthesis of the respective image elements. Further, transparency data pertaining to the respective image elements are synthesized, to thus generate transparency data pertaining to the synthesized image. The thus-generated object data (the pixel value data and the transparency data) pertaining to the synthesized image are output to the rendering processing section 15 in conjunction with the rendering command. These sets of object data are synthesized on the data of a run length format. Details on synthesis processing of each of the sets of object data will be described later.

The rendering processing section 16 acquires the rendering command and the object data from the synthesis processing section 14 and subjects the object data to rendering in accordance with the acquired rendering command, thereby converting the object data into raster data. Specifically, the pixel value data are subjected to rendering, to thus generate an image (raster data) based on a two-dimensional arrangement of pixel values. The transparency data are subjected to rendering, to thus generate a two-dimensional arrangement (raster data) of an alpha value. Alpha values of the respective pixels acquired as a result of the transparency data being subjected to rendering are imparted to the respective pixels of an image obtained as a result of the pixel value data being subjected to rendering. The raster data acquired through these processing operations are output to the color conversion processing section 16. Rendering of the present embodiment will be described in detail later.

The color conversion processing section 16 converts the raster data acquired from the rendering processing section 15 into image information of a color system [e.g., Y (yellow), M (magenta), C (cyan), and K (black)] used for print processing performed by the image forming section 20 through color conversion processing. The thus-converted data are subjected to compression processing. The resultantly-obtained data are output to the screen processing section 17.

The screen processing section 17 subjects to screen processing multivalued raster data for respective color components (YMCK) input from the color conversion processing section 16, thereby binarizing the raster data. The word "screen processing" means processing for converting a multivalued image having density gradation into a binary image by artificially expressing the density of a halftone image according to the size of a coloring dot called a halftone dot. The screen processing section 17 outputs the thus-generated binary image data to the image forming section 20.

Figure 2:
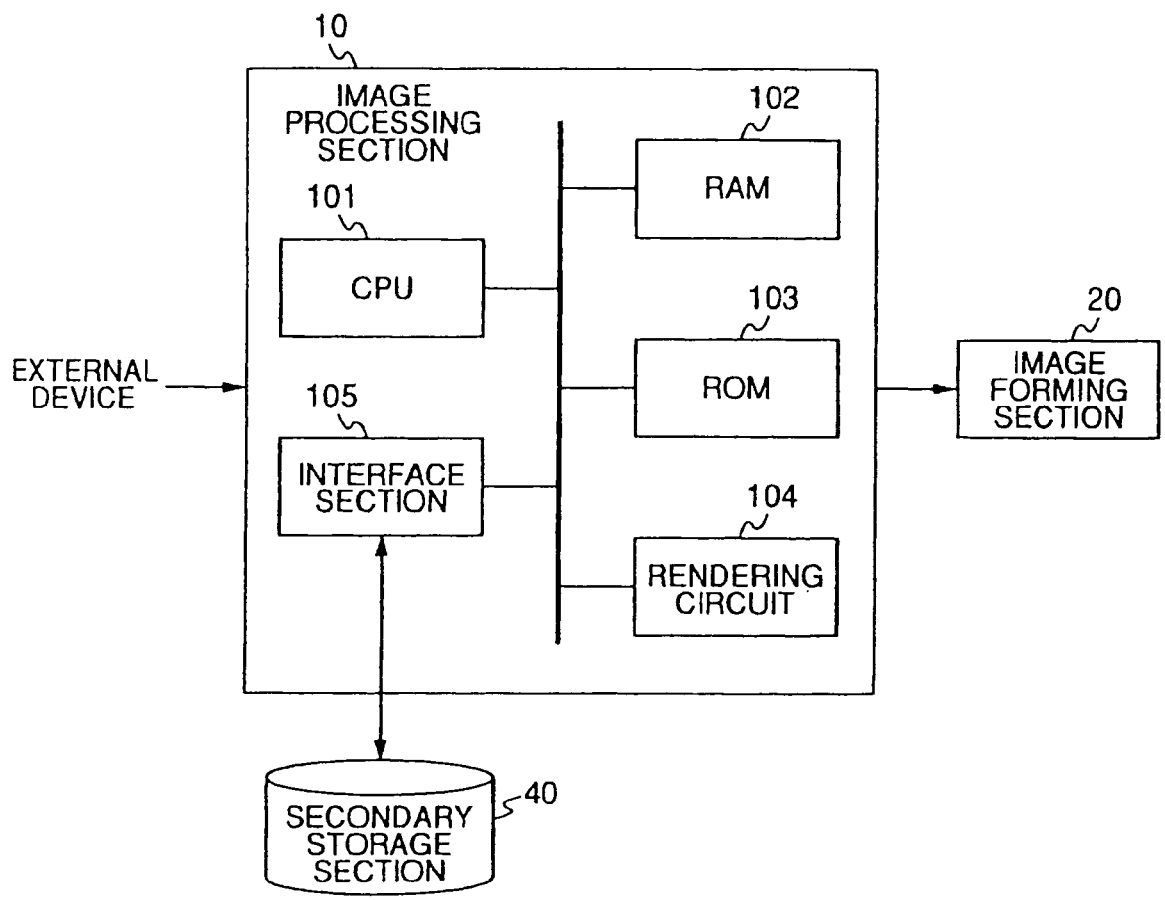
FIG. 2 is a view exemplifying the hardware configuration of the image processing section 10 of the present embodiment.

FIG. 2 is a view exemplifying the hardware configuration of the image processing section 10 of the present embodiment.

As shown in FIG. 2, the image processing section 10 has a CPU 101 which executes computing operation in accordance with a processing program; RAM (Random Access Memory) 102 used as work memory, or the like, of the CPU 101; and ROM (Read-Only Memory) 103 which holds processing programs, and the like, executed by the CPU 101. The CPU 101 reads the processing program from the ROM 103 at power-on of the image forming apparatus 100, whereby functions of the image processing section 10 of the previously-described embodiment are implemented. The image processing section 10 has a rendering circuit 104 which performs rendering operation among the previously-described functions. The configuration of the rendering circuit 104 will be described later. Further, the image processing section 10 has an interface section 105 for controlling inputting and outputting of a signal between the image forming section 20 and the secondary storage section 40. For instance, a color conversion coefficient, a screen parameter, and the like, are held in the secondary storage section 40.

Processing for generating data of a run length format, synthesis processing, and rendering of the present embodiment will now be described in detail.

First, processing for generating data of a run length format performed by the PDL analysis section 13 will be described. The PDL analysis section 13 is embodied by; for example, the program-controlled CPU shown in FIG. 2.

When the attribute of the pixel element to be processed is; for example, a "photograph," the PDL analysis section 13 analyzes the PDL data pertaining to an output image read from the input buffer 12, thereby generating raster data (two-dimensional arrangement data) pertaining to the image elements. In this raster data, each pixel is imparted with information, such as a pixel value, an alpha value, and attributes. The thus-generated raster data are held in internal memory (e.g., the RAM 102 in FIG. 2) of the image processing section 10 and data holding unit embodied by the secondary storage section 40. Next, the PDL analysis section 13 generates, from the raster data, object data (pixel value data and transparency data) expressed as an aggregation of sets of data of a run length format, in relation to a pixel value and an alpha value of each image element. The object data are formed by making reference to run-length encoded data and raster data pertaining to a corresponding image element. The object data and the raster data are held in the data holding unit implemented by the internal memory (e.g., the RAM 102 shown in FIG. 2) of the image processing section 10 and the secondary storage section 40. Specifically, the data holding unit functions also as pixel value data (data sequence) holding unit and transparency data (data sequence) holding unit.

FIG. 3 is a view for describing run-length encoding operation. FIG. 3A shows an example image element expressed in a raster format. FIG. 3B shows a run-length encoded image element identical to that shown in FIG. 3A. FIG. 3C shows a data structure for one line (enclosed by a dashed line) shown in FIG. 3B. Run-length encoded data are hereinafter called "run-length data."

As shown in FIG. 3, the raster data express an image element by arrangement of dots, whilst the run-length data represent an image element by a range (indicated by the length of an arrow in FIG. 3B) where given pixel values, or the like, are arranged consecutively. For example, rung-length data pertaining to a pixel value are generated by replacing an area of the raster data where identical pixel values are continuously arranged into length (run-length) information; that is, a "pixel value" and the "number of iterations (the number of pixels)." As shown in FIG. 3, run-length data are generated as a (one-dimensional) data sequence for each line.

Since an image is expressed by values, such as pixel values, and the number of values, according to the run-length encoding scheme, a high compression rate is achieved when constant values are continuously arranged. In the meantime, in the case of an image whose values gradually change, just as a gradation, or a photographic image for which various values are often imparted on a per-pixel basis, difficulty is encountered in acquiring a high compression rate. Accordingly, in the present embodiment, an address—by which reference is made to the raster data generated by the PDL analysis section 13—is described in lieu of the value in relation to such an image, whereby object data are generated in a format (a run length format) analogous to that of the run-length data. Both the run-length data which are run-length encoded data and the data in which reference to raster data is described in the same format as that of run-length data are hereinafter called "data of a run length format." When these sets of data must be distinguished from each other, the former data are described as "rung-length data," and the latter data are described as "data of a run length format by reference."

FIG. 4 is a view for describing a data structure of data of a run length format by reference. FIG. 4A shows an example image of a raster format to which reference is to be made. FIG. 4B shows an example image of a run length format. FIG. 4C shows a data structure for one line (an area enclosed by a dashed line) in FIG. 4B.

In the data of a run length format by reference, an image element is expressed by a range within which reference is made to raster data (described as the length of an arrow in FIG. 4B). Specifically, as shown in FIG. 4C, the image element is formed by including an address (a reference address) on raster data corresponding to a starting point of a reference range and length information; that is, the number of pixels for which reference is made to raster data (attributes, an alpha value, and the like, are described in additional information). In the example shown in FIG. 4, reference is made to the raster data shown in FIG. 4A over the entirety of an image element.

As mentioned above, reference made to the raster data is expressed by a data structure identical with that of the run-length data, whereby the data of the run length format by reference are also generated as a (one-dimensional) data sequence for each line. Consequently, an image obtained as a result of synthesis of the respective image elements and pixels elements to be described later comes to be expressed as an aggregation of one-dimensional data sequences.

Figure 5A:
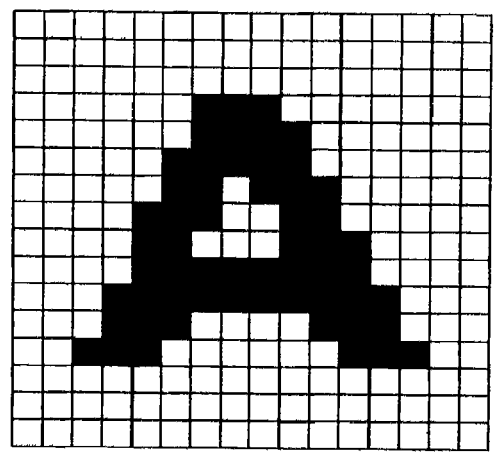
FIGS. 5A to 5C are views showing object data generated in the present embodiment.
Figure 5B:
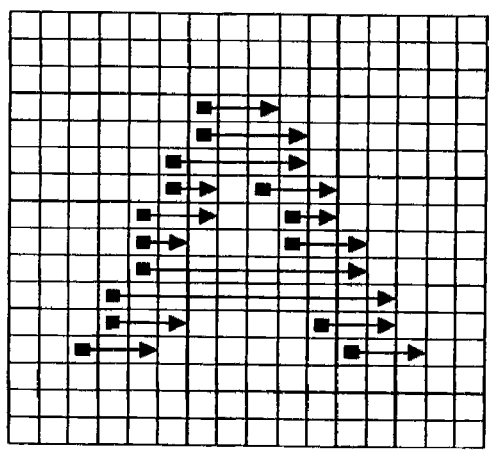
Figure 5C:
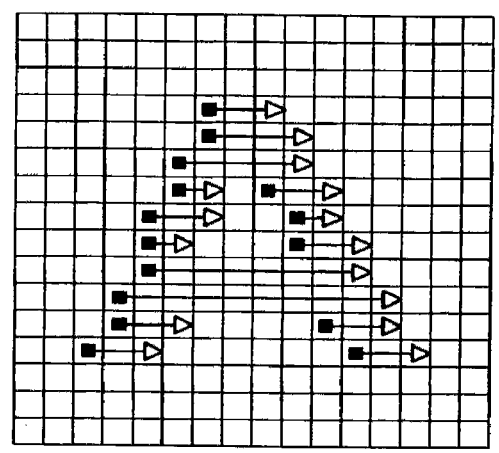

In the present embodiment, transparency data (data of a run length format pertaining to alpha values) are generated as object data representing an image element, as in the case of the previously-described pixel value data (the data of the run length format pertaining to pixel values). Specifically, as shown in FIG. 5, two types of sets of object data of a run length format (FIG. 5B and FIG. 5C), such as pixel value data and transparency data, are obtained from the raster data (FIG. 5A) pertaining to the image elements obtained by analysis of the PDL data.

Synthesis processing performed by the synthesis processing section 14 will now be described.

The synthesis processing section 14 of the present embodiment is embodied by; for example, the program-controlled CPU 101 shown in FIG. 2. As mentioned previously, the object data (the pixel value data and the transparency data) generated by the PDL analysis section 13 are synthesized on the data of the run length format (i.e., without being expanded to raster data). Specifically, the synthesis processing section 14 functions as generation unit which generates pixel value data pertaining to a synthesized image by synthesizing pixel value data pertaining to respective image elements and as a generation unit which generates transparency data pertaining to the synthesized image by synthesizing transparence data pertaining to the respective pixel elements.

FIG. 6 is a view showing an example image—in which a plurality of image elements are synthesized—and data of a run-length format.

Figure 6A:
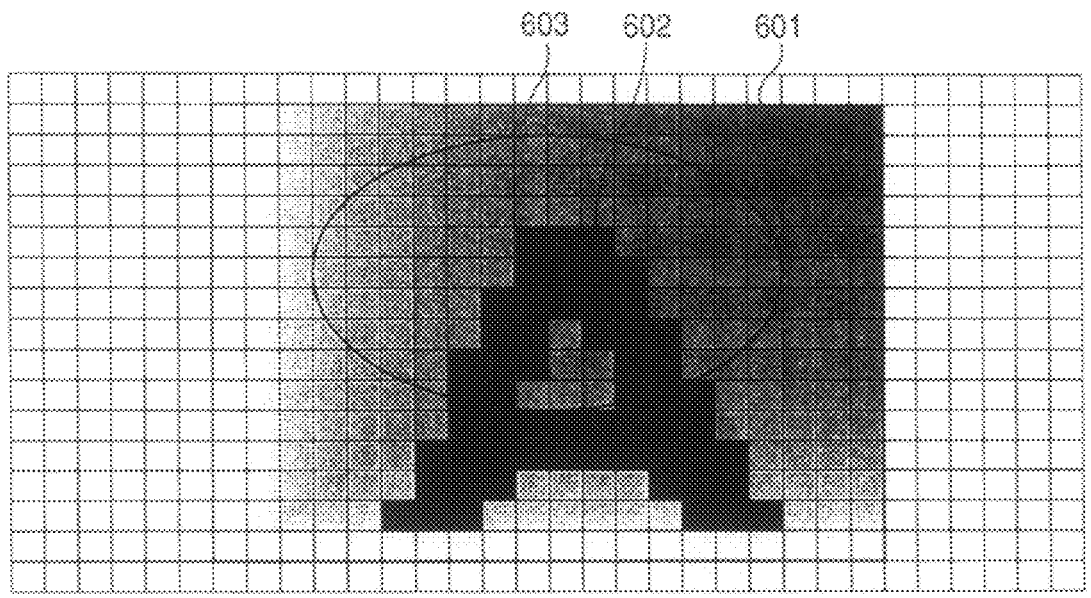
FIGS. 6A and 6B are views showing an example image— in which a plurality of image elements are synthesized—and data of a rung-length format.
Figure 6B:
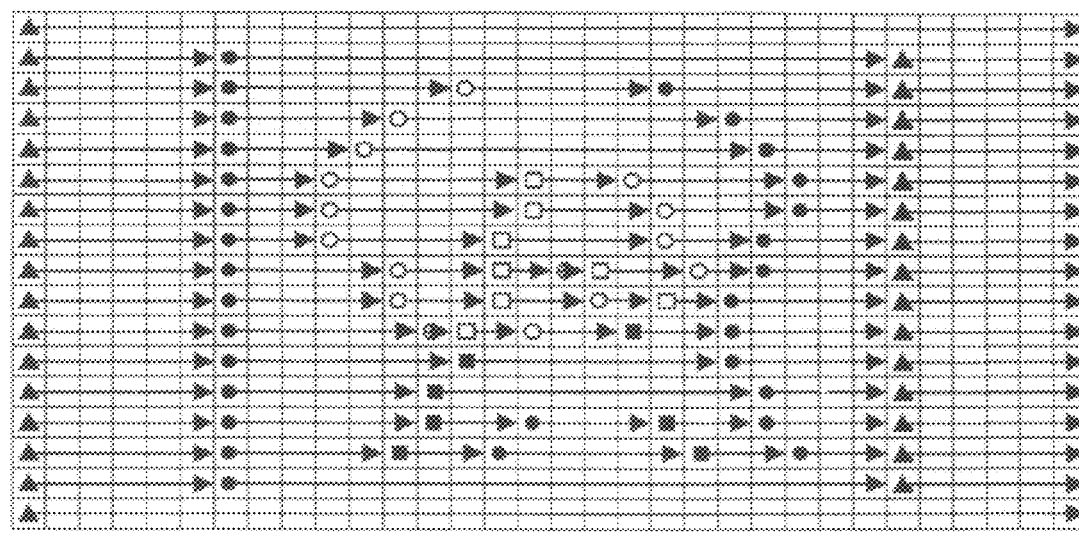

In an example shown in FIG. 6A, image elements; that is, a photograph 601, a character 602, and a graphics 603, are assumed to be superimposed in this sequence on a background image serving as the lowermost base layer. An attribute of the background image is assumed to be a graphics. FIG. 6B shows an aggregation of data of a run length format representing the image shown in FIG. 6A. In FIG. 6B, arrows starting from solid triangles designate the range of a background image; arrows starting from solid circles designates the range of image elements of the photograph 601; and arrows starting from solid squares designate the range of image elements of the character 602. Moreover, a semitransparent graphics (the graphics 603) is superimposed on a range of a graphic whose starting points are outlined.

FIG. 7 is a view showing the manner of an image element being synthesized on data of a run length format in relation to a pixel value in a predetermined one line (an area enclosed by a dashed line) in FIG. 6B. In FIGS. 7A to 7D, a relationship between arrows and an image element is the same as that shown in FIG. 6. An arrow starting from a rhomboid designates a range of the image element of the graphics 603. The starting point of this arrow is illustrated as being outlined, which shows that the image element is a semitransparent image. Specifically, transparency (an alpha value) of the graphics 603 assumes values ranging from 0 to 1. In contrast, both the transparency of the photograph 601 and the transparency of the character 602 assume a value of one.

When a pixel value is synthesized by alpha-blending, a pixel value D' achieved after synthesis is computed by; for example, the following equation.

$$D'=(S \times S\alpha + D \times (1-S\alpha) \times D\alpha) + D'\alpha \quad (1)$$

Reference symbol D designates a pixel value {a vector, D(R, G, B), or the like} of a base; Dα designates the transparency of the base; S designates a pixel value {a vector, D(R, G, B), or the like} of an upper object (a rendering object); and Sα designates the transparency of the upper object. Further, D'α designates the transparency of the base achieved after synthesis, which is computed by the following equation.

$$D'\alpha = S\alpha + D\alpha \times (1-S\alpha) \quad (2)$$

Figure 7A:
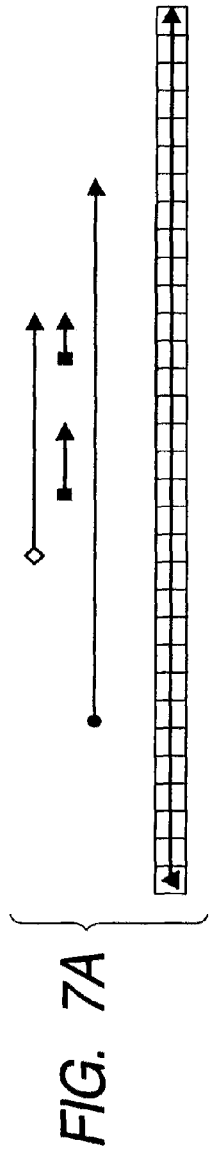
FIGS. 7A to 7D are views showing the manner of an image element being synthesized on data of a run length format in relation to a pixel value in a predetermined one line (an area enclosed by a dashed line) in FIG. 6B.

FIG. 7A shows a state where only a background image is described as data of a run length format for one line.

Figure 7B:
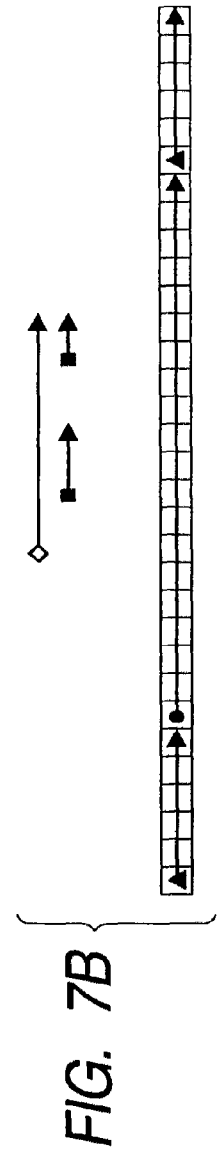

FIG. 7B shows a state where data of a run length format pertaining to the photograph 601 are superimposed on the background image serving as a base. Since the transparency (Sα) of the photograph 601 serving as an upper object assumes a value of one, D'=S is achieved from Equation (1), so that data pertaining to the photograph 601 are overwritten.

Figure 7C:
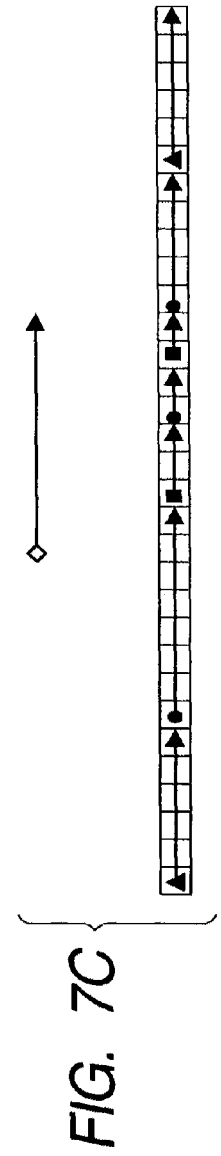

FIG. 7C shows a state where the data of a run length format pertaining to the character 602 are superimposed on the synthesized image which is shown in FIG. 7B and which serves as a base. Even in this case, since the transparency (Sα) of the character 602 serving as an upper object assumes a value of one, the data pertaining to the character 602 come to become overwritten.

Figure 7D:
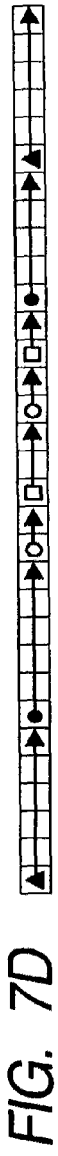

FIG. 7D shows a state where the data of a run-length type pertaining to the graphics 603 are superimposed on the synthesized image which is shown in FIG. 7C and which serves as a base. In this case, the transparency (S+) of the graphics 603 serving as an upper object assumes a value ranging from zero to one, and hence a pixel value falling within the range—where the graphics 603 is superimposed—comes to a value D' computed by Equation (1). In FIG. 7D, figures of starting points (i.e., circles for the photograph 601 and squares for the character 602) are outlined, thereby showing that another image element is further superimposed on the area where the graphics 603 has been superimposed.

As mentioned above, as a result of the image elements being synthesized on the data of the run length format, there is obviated a necessity for copying data pertaining to a synthesized image to the data holding unit (e.g., the RAM 102 or the secondary storage section 40 shown in FIG. 2) every time each image element is superimposed. Therefore, when compared with a case where data pertaining to a synthesized image are generated every time each image element is synthesized, the amount of use of memory required for processing becomes smaller. Moreover, the number of times an access is made to the data holding unit is reduced, and a time required to perform processing is also shortened.

However, in the case of FIG. 7D, in order to synthesize pixel values of respective pixels within the range where the graphics 603 is superimposed, computation must be performed by use of the raster data on a per-pixel basis according to Equation (1). However, even in this case, there is no necessity for newly generating raster data pertaining to such a synthesized image, and the essential requirement is to synthesize the pixel value from the raster data generated by the PDL analysis section 13. Consequently, when compared with the case of the technique where data pertaining to a synthesized image are generated every time each image element is synthesized, the amount of use of memory required for processing is reduced.

Figure 12:
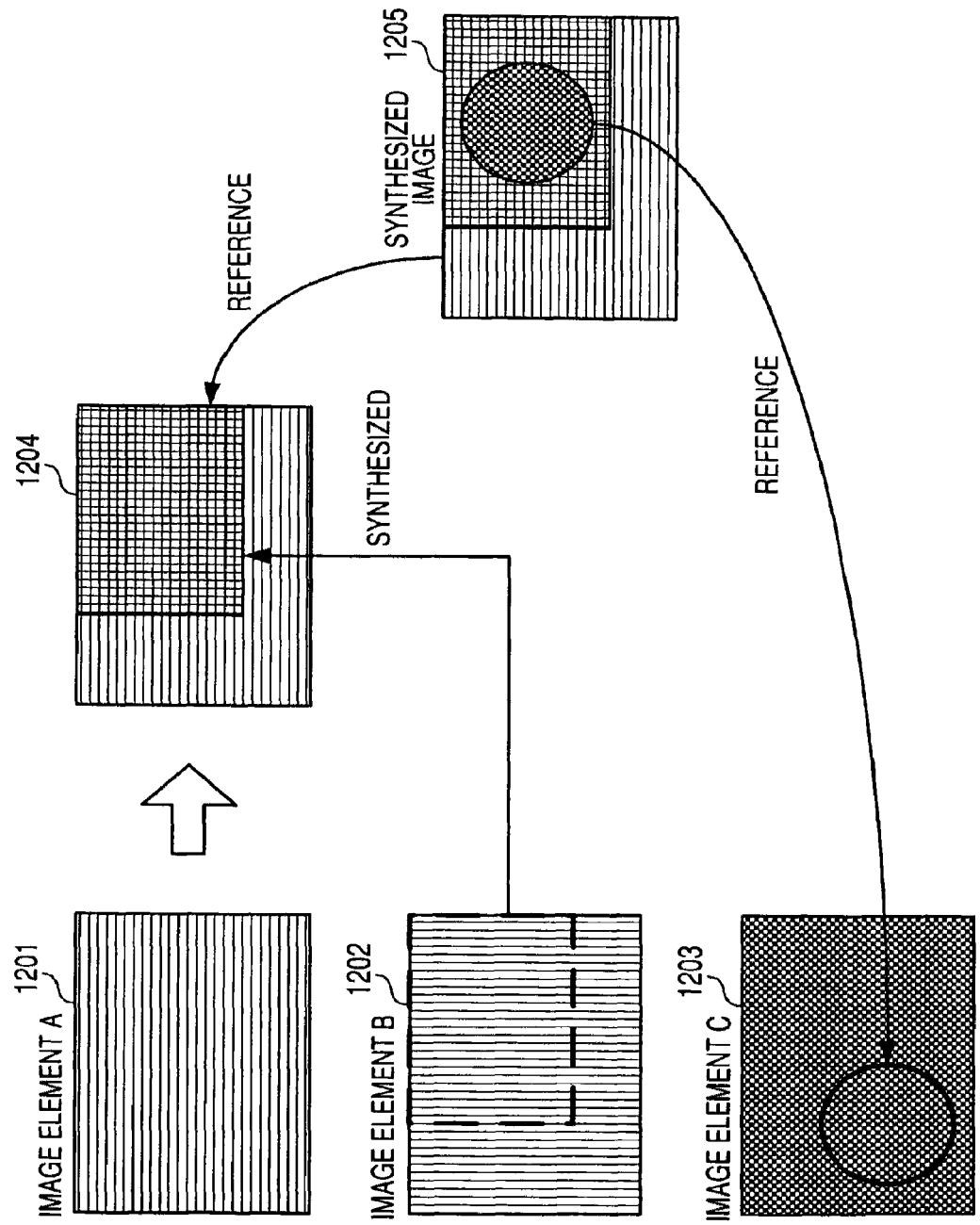
FIG. 12 is a view for describing a relationship between synthesis and reference which are performed in relation to the raster data.

FIG. 12 is a view for describing a relationship between synthesis and reference which are performed in relation to the raster data.

In an example shown in FIG. 12, there are raster data 1201 to 1203 pertaining to image elements A to C generated by the PDL analysis section 13. The image element B is superimposed on the image element A by taking the image element A as a base. Further, the image element C is superimposed on the image element B by taking the image element B as a base. Synthesis of the image element B corresponds to semitransparent synthesis, and synthesis of the image element C corresponds to overwriting. Now, an attention is paid to a case where the image element B (indicated by a broken line) is superimposed on the image element A. In this case, a pixel value of an area of interest in the raster data 1201 pertaining to the image element A is replaced with a value D' computed according to Equation (1), whereby the raster data 1201 are replaced with raster data 1204.

FIG. 8 is a view analogous to FIG. 7 showing the manner of, in one line (an area enclosed by a dashed line) shown in FIG. 6B, an image element being synthesized on the data of a run length format with regard to an alpha value. In FIGS. 8A to 8D, a relationship between arrows and an image element is the same as those shown in FIGS. 6 and 7. In order to distinguish the arrow showing the range of the pixel value shown in FIG. 7, the head of the arrow is represented as being outlined. Further, as in the case of FIG. 7, the transparency of the graphics 603 assumes a value ranging from zero to one, and the transparency of the photograph 601 and the transparency of the character 602 assume a value of one.

Figure 8A:
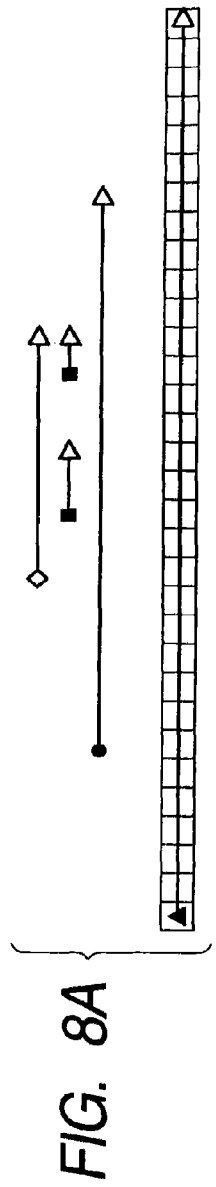
FIGS. 8A to 8D are views analogous to FIG. 7 showing the manner of, in one line (an area enclosed by a dashed line) shown in FIG. 6B, an image element being synthesized on the data of a run length format with regard to an alpha value.

FIG. 8A shows a state where only a background image is described as data of a run length format for one line. The transparency of the background image is herein presumed to be zero. Specifically, all image elements superimposed on the background image are written over the background image.

Figure 8B:
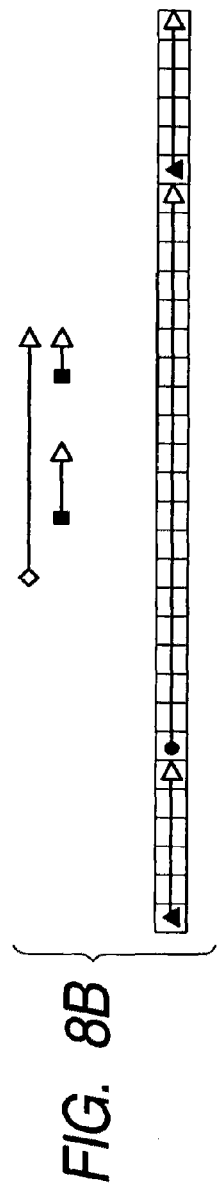

FIG. 8B shows a state where data of a run length format pertaining to the photograph 601 are superimposed on the background image by taking the background image as a base. Here, since the transparency (Sα) of the photograph 601 that is an upper object assumes a value of one, the transparency (D'α) of the range where the data pertaining to the photograph 601 are superimposed assumes a value of one according to Equation (2).

Figure 8C:
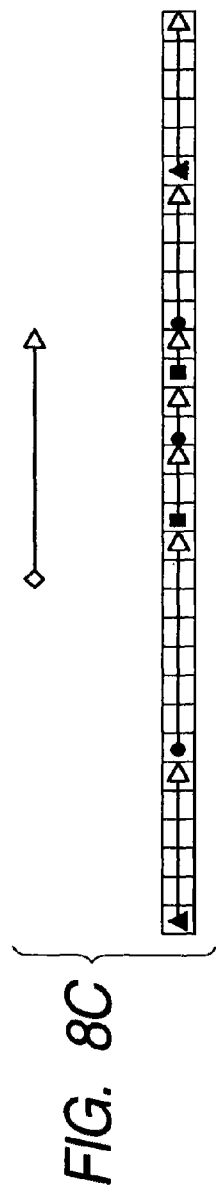

FIG. 8C shows a state where data of a run length format pertaining to the character 602 are superimposed on the synthesized image shown in FIG. 8B, by taking the synthesized image as a base. Even in this case, since the transparency (Sα) of the character 602 that is an upper object assumes a value of one, the transparency (D'α) of the range where the data pertaining to the character 602 are superimposed assumes a value of one according to Equation (2).

Figure 8D:
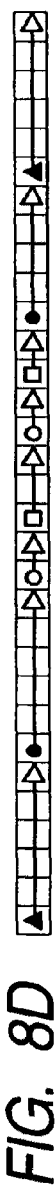

FIG. 8D shows a state where data of a run length format pertaining to the graphics 603 are superimposed on the synthesized image shown in FIG. 8C, by taking the synthesized image as a base. In this case, the transparency (Sα) of the graphics 603 that serves as an upper object assumes a value ranging from zero to one. Hence, the transparency of the range where the graphics 603 is superimposed comes to a value D'α computed by Equation (2). Since the transparency (Dα) of the base assumes a value of one, we have D'α=1 according to Equation (2). As in the case of FIG. 7D, figures of starting points (i.e., a circles for the photograph 601 and squares for the character 602) are outlined in the area where the graphics 603 is superimposed, thereby showing that another image element is superimposed.

FIG. 9 is a drawing showing an example configuration of data of a run length format.

In the example data configuration shown in FIG. 9, the following four fields 901 to 904 are provided for the respective image elements (including the background image) in the data of a run length format shown in FIG. 7D. Information used for identifying a continuous element or pixel reference is recorded in the field 901. The information is for identifying the type of data; namely, run-length encoded data (run-length data) or data of a run length format in which an address used for making reference to raster data is described. In the example shown in FIG. 9, data of the former type are described as "continuous pixel," and data of the latter type are described as "pixel reference." The number of continuous pixels showing a range is recorded in the field 902. A pixel value or a reference address is recorded in the field 903. An attribute of the image element is described in the field 904. Although an example data configuration of a run length format pertaining to a pixel value (pixel value data) are illustrated, data of a run length format pertaining to an alpha value (transparency data) also assume the same configuration. In the case of the transparency data, an alpha value or a reference address is recorded in the field 903.

By reference to the fields 902 and 904 of the data configuration shown in FIG. 9, it is understood that six pixels from the starting point (the left end) of the line correspond to a graphics (a background image); that next five pixels correspond to the photograph 601; that the next three pixels correspond to the photograph 601; that the next three pixels correspond to the character 602; that the next two pixels correspond to the photograph 601; that the next two pixels correspond to the character 602; that the next five pixels correspond to the photograph 601; and that the final six pixels correspond to a graphic (the background image). Since the graphics (the background image) and the character 602 have a constant pixel value, they are now in the form of run-length encoded data (run-length data) (the field 901 shows a "Continuous Element"). In the meantime, in relation to the photograph 601, reference must be made to the a pixel value of raster data, and hence the photograph is now in the form of data of a run length format where a reference address (an address of a pixel corresponding to the raster data) is described in the field 903 (the field 901 shows "Pixel Reference"). Although second and third rows correspond to the same photograph 601, the third row falls within the range where the graphics 603 is superimposed and, hence, is distinguished from the second row. The illustrated example shows the image element of the same photograph 601. However, when an attribute of an image element changes as a result of synthesis (when an attribute of an upper object is set or a like case), the image elements are described separately.

Figure 10:
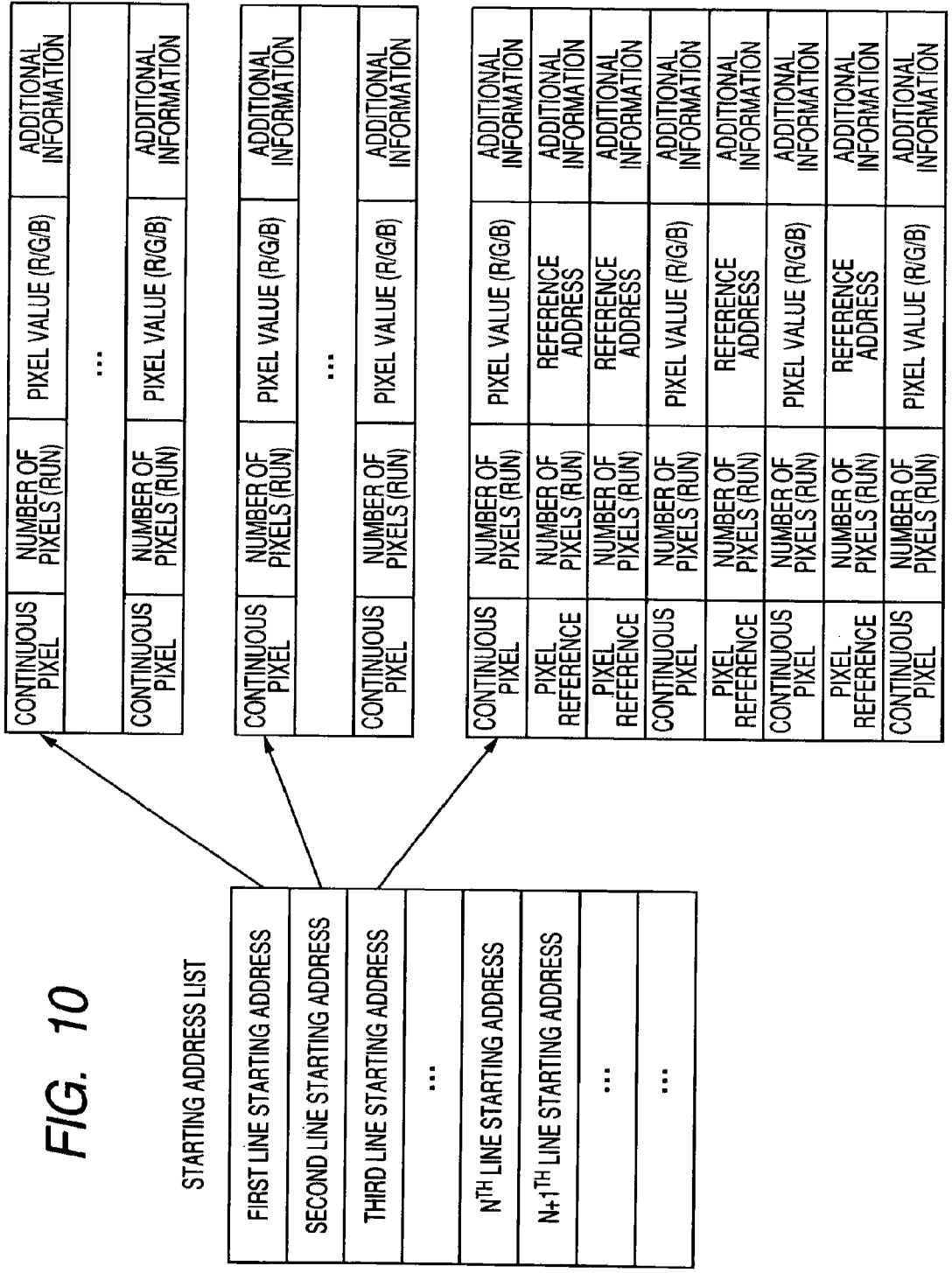
FIG. 10 is a view showing an example data configuration of an overall image for one page with regard to a pixel value.

FIG. 10 is a view showing an example data configuration of an overall image for one page with regard to a pixel value.

The data configuration shown in FIG. 10 is formed from data of a run length format (pixel value data) pertaining to respective lines corresponding to an overall image for one page and a list of leading address of all lines. As indicated by the field 904 shown in FIG. 9, information, such as an attribute of an image element, is recorded in the field of "Additional Information" included in the data of a run-length type for each line shown in FIG. 10.

Figure 11:
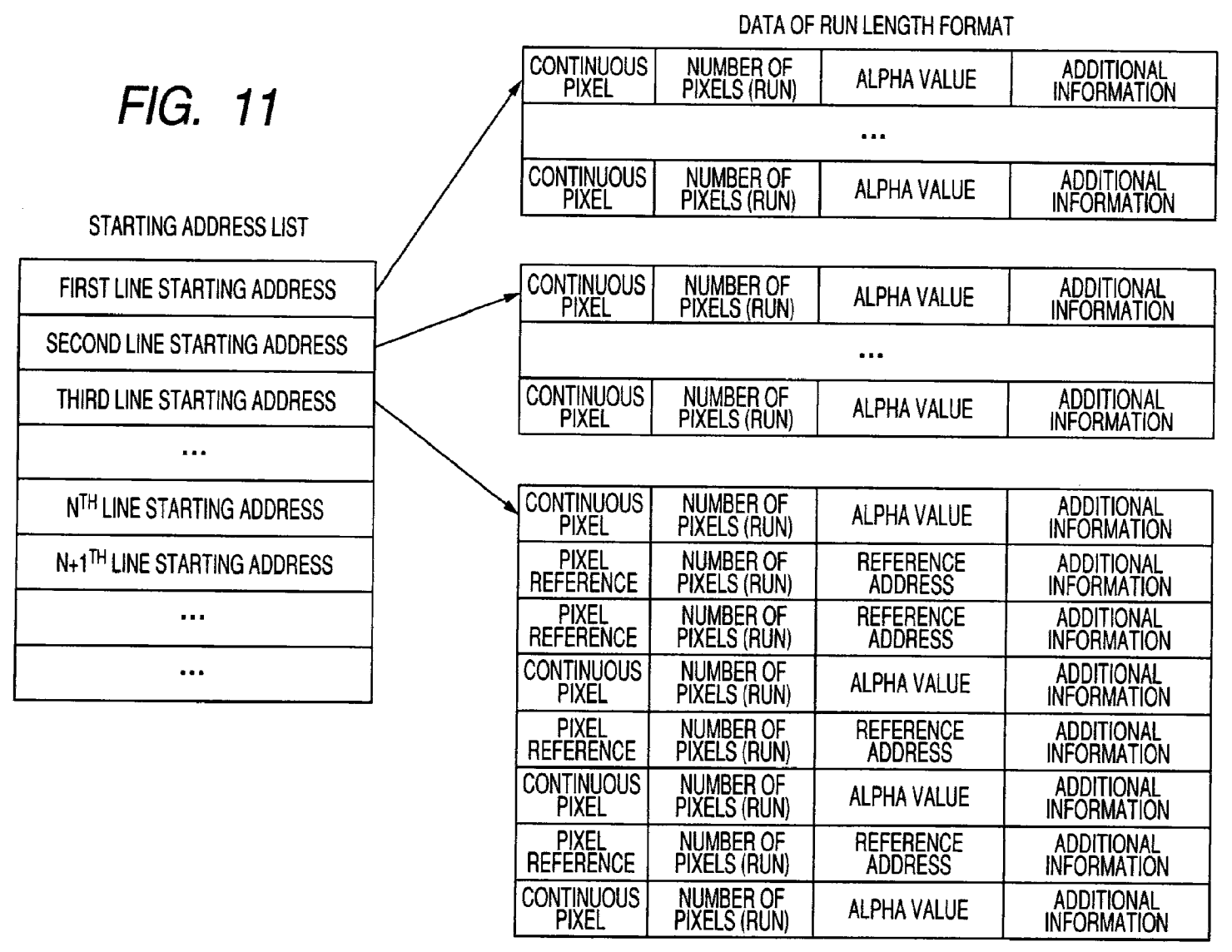

FIG. 11 is a view showing an example data configuration of an overall image for one page with regard to transparency (an alpha value).

The data configuration shown in FIG. 11 is formed from data of a run length format (transparency data) pertaining to respective lines corresponding to an overall image for one page and a list of leading address of all lines. Each of sets of the transparency data of a run length type is formed in the same manner as are the pixel value data shown in FIG. 9. Information, such as an attribute of an image element, is recorded in the field "Additional Information" included in the data of the run length format pertaining to the respective lines shown in FIG. 11. There are occasions where transparency continuously changes or assumes various values for each pixel depending on an image element. In relation to such an image element, reference is made to transparency (an alpha value) of a corresponding pixel in raster data generated by the PDL analysis section 13 or raster data pertaining to a synthesized image converted during the course of synthesis processing performed by the synthesis processing section 14, as in the case of a pixel value (the range of pixel reference shown in FIG. 11).

As mentioned above, the object data (the pixel value data and the transparency data) synthesized for each set of data of a run length format are retained in the data holding unit embodied by internal memory (e.g., the RAM 102 shown in FIG. 2) of the image processing section 10 or the secondary storage section 40.

The previously-described data of a run length format and the data configuration of the entire image for one page are mere illustration, and another data configuration encompassing similar information can also be taken.

Reference to raster data will now be described by reference to previously-described FIG. 12.

As mentioned above, as a result of the image element A and the image element B having been semitransparently synthesized, the raster image 1201 is converted into the raster data 1204 pertaining to a synthesized image. In this case, when a final synthesized image 1205 is generated, reference is made to the raster data 1203 with regard to the overwritten image element C. With regard to the other portions, reference is made to the raster data 1204. Since an area of the raster data 1204 where the image element B is superimposed assumes the value computed through alpha blending (a pixel value and an alpha value) as mentioned previously, a value achieved after synthesis can be obtained by making reference merely to a corresponding address of the raster data 1204.

A program for causing the CPU 101 to implement the function of the PDL analysis section 13 and the function of the synthesis processing section 14, which have been described above, is previously recorded in the ROM 103 of the image processing section 10 constituting the image forming apparatus 100. Alternatively, the program may also be provided by previously recording the program in another recording medium, such as a magnetic disk, an optical disk, or semiconductor memory, and distributing the recording medium, or by distributing the program over a network.

Next will be described rendering performed by the rendering section 15.

The rendering section 15 is an image generation unit for generating an image in accordance with the data of the run length format generated as mentioned above. In the present embodiment, hardware (e.g., the rendering circuit 104 shown in FIG. 2) embodied as an ASIC (Application Specific Integrated Circuit), or the like, performs rendering by use of data pertaining to an image synthesized on the data of the run length type as shown in FIGS. 10 and 11.

Figure 13:
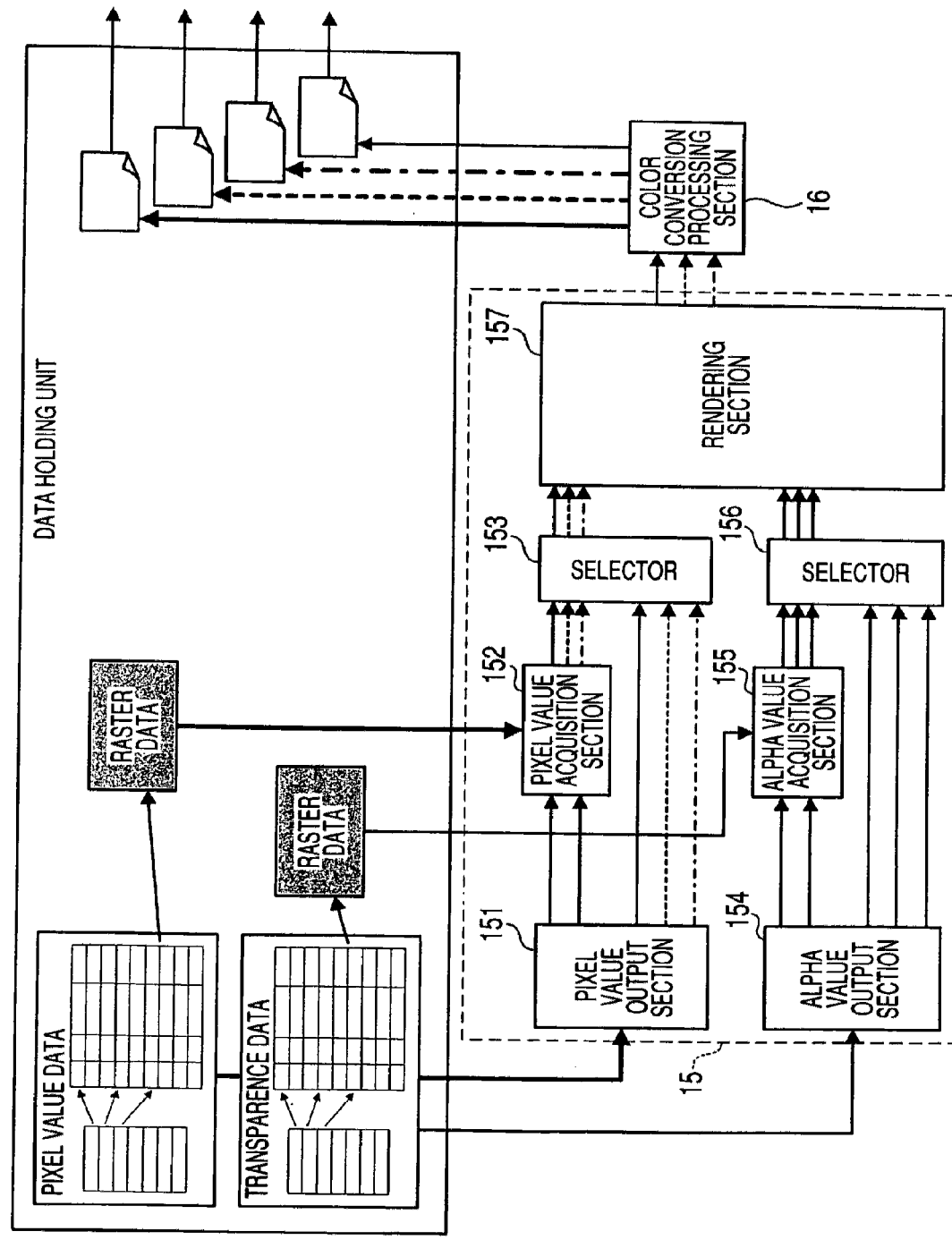
FIG. 13 is a view showing an example hardware configuration of a rendering section of the present embodiment.

FIG. 13 is a view showing an example hardware configuration of the rendering section 15 (the rendering circuit 104) of the present embodiment.

As shown in FIG. 13, the rendering section 15 includes a pixel value output section 151; a pixel value acquisition section 152; a selector 153; an alpha value output section 154; an alpha value acquisition section 155; a selector 156; and a rendering section 157. In FIG. 13, a list of data of a run length format and starting addresses of respective lines, the raster data generated by the PDL analysis section 13, data pertaining to a print image output from the color conversion section 16, and the like, are held in single data holding unit. However, this merely means that the data holding unit is embodied in work areas of various types of storage devices (e.g., the RAM 102 and the secondary storage section 40 shown in FIG. 2), and does not mean that the data holing unit is embodied by single physical memory.

The pixel value output section 151 is embodied by; for example, DMA (Direct Memory Access). The pixel value output section 151 reads pixel value data held in the data holding unit embodied by the internal memory (e.g., the RAM 102 shown in FIG. 2) of the image processing section 10 or the secondary storage section 40. In relation to pixel value data whose type is "Continuous Pixel," a pixel value described in the field 903 shown in FIG. 9 is output by an amount corresponding to the number of pixels described in the field 902. As a result, the pixel value data corresponding to run-length data are expanded. Further, the pixel value output section 151 passes, to the pixel value acquisition section 152, pixel value data whose type is "Pixel Reference" among the read pixel value data.

The pixel value acquisition section 152 is embodied by; for example, DMA. The pixel value acquisition section 152 makes reference to a corresponding address of the data holding unit in accordance with a reference address described in the field 903 of the pixel value data received from the pixel value output section 151. In accordance with the number of pixels described in the field 902, values of pixels equal in number to arranged pixels are read from pixels of raster data situated at the reference address.

The selector 153 receives the pixel values output from the pixel value output section 151 and the pixel value acquisition section 152 and sequentially send the thus-received pixel values to the rendering section 157. As a result, the pixel value expanded from the run-length data and the pixel value read from the raster data of the data holding unit are merged together, whereby a pixel value for one page is obtained.

The pixel value output section 151, the pixel value acquisition section 152, and the selector 153 act as pixel value data expansion unit for expanding pixel value data.

The alpha value output section 154 is embodied by; e.g., DMA. The alpha value output section 154 reads transparency data held in the data holding unit. In relation to transparency data whose type is "Continuous Element," an alpha value described in the field 903 shown in FIG. 9 is output by an amount equal in number to the pixels described in the field 902. As a result, the transparency data corresponding to run-length data are expanded. Moreover, the alpha value output section 154 passes, to the alpha value acquisition section 155, transparency data whose type is "Continuous Type" among the read transparency data.

The alpha value acquisition section 155 is embodied by; e.g., DMA. The alpha value acquisition section 155 makes reference to a corresponding address of the data holding unit in accordance with a reference address described in the field 903 of the transparency data received from the alpha value output section 154. In accordance with the number of pixels described in the field 902, alpha values of pixels equal in number to arranged pixels are read from pixels of raster data situated at the reference address.

The selector 156 receives the alpha values output from the alpha value output section 154 and the alpha value acquisition section 155 and sequentially send the thus-received pixel values to the rendering section 157. As a result, the alpha value expanded from the run-length data and the alpha value read from the raster data of the data holding unit are merged together, whereby an alpha value for one page is obtained.

The alpha value output section 154, the alpha value acquisition section 155, and the selector 156 act as transparency data expansion unit for expanding transparency data.

The rendering section 157 merges (alpha blends) the pixel value received by way of the selector 153 and the alpha value received by way of the selector 156, and outputs a result of merging to the color conversion processing section 16. Specifically, the rendering section 157 acts as a processing unit which generates an image from the pixel value data and which imparts information (an alpha value) pertaining to transparence to an image in accordance with the transparency data.

Synthesis (alpha blending) performed by the rendering section 157 is carried out by subjecting; e.g., respective pixels of raster data pertaining to a synthesized image to the following computation.

Pixel value achieved after synthesis=$\alpha \times$pixel value achieved before synthesis+$(1-\alpha) \times$white color Reference symbol a designates an alpha value of a pixel of interest. Further, white color is based on the assumption that a background color is white (the color of an ordinary print sheet).

The rendering section 157 merges the raster data pertaining to a synthesized image with raster data pertaining to an alpha value. However, in place of raster data pertaining to an alpha value, another image data may also be set as a background image, and the image data may be merged with the raster data pertaining to the synthesized image (through alpha blending). As a result, a mail merge may also be performed.

The rendering section 157 is described as merging the raster data pertaining to a synthesized image with raster data pertaining to an alpha value. However, these sets of data do not need to be merged. When the sets of data are not merged, the raster data pertaining to the synthesized image and the raster data pertaining to the alpha value may also be output in unmodified form.

The color conversion processing section 16 changes the color space of the synthesized image, as necessary, into a required color space of the image forming section; e.g., Y (yellow), M (magenta), C (cyan), and K (black). Another function, such as a data compression, may also be provided along with the color conversion function or in place of the color conversion function.

Data output from the rendering section 157 may also be output to the data holding unit without conversion. In this case, an output image or an output image and transparency data may also be handled as a single image element and again subjected to image processing of the present embodiment.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An image forming apparatus comprising:
   a first holding unit that holds a pixel value data sequence which represents an image element as an aggregation of one-dimensional data sequences and in which each of the data sequences is formed by a pixel value, a number of pixels of the pixel value to be repeated, and attribute information of the pixel value, or by the pixel value, the number of pixels of the pixel value to be repeated, reference to a reference pixel corresponding to image value arrangement data stored in a predetermined data holding unit, and a number of pixels of the reference pixel to be repeated;
   a second holding unit that holds a transparency data sequence in which each of the one-dimensional data sequences is formed by a coefficient representing transparency of a pixel value in the image element, a number of pixels of the coefficient to be repeated, and attribute information of the coefficient, or by the coefficient, the number of pixels of the coefficient to be repeated, reference to a reference coefficient corresponding to coefficient arrangement data pertaining to the coefficient held in the predetermined data holding unit, and a number of pixels of the reference coefficient to be repeated; and an image generation unit that forms an image from the pixel value data sequence held in the first holding unit, and that generates information about transparency of the image from the transparency data sequence held in the second holding unit.

2. The image forming apparatus as claimed in claim 1, wherein the image generation unit generates an image by arranging pixels according to the pixel value in the pixel value data sequence and the number of pixels of the pixel value to be repeated or according to the pixel value, the number of pixels of the pixel value to be repeated, the reference pixel, and the number of pixels of the reference pixel to be repeated, and generates information about the transparency of the image by arranging coefficients according to the coefficient in the transparency data sequence and the number of pixels of the coefficient to be repeated or according to the coefficient, the number of pixels of the coefficient to be repeated, the reference coefficient, and the number of pixels of the reference coefficient to be repeated.

3. The image forming apparatus as claimed in claim 1, wherein the image generation unit comprises:

a data sequence generation processing section that generates a pixel value data sequence of a synthesized image by sequentially synthesizing the pixel value data sequence for each image element and the transparency data sequence for each image element, and that generates a transparency data sequence of the synthesized image by sequentially synthesizing the transparency data sequence for each image element; and a rendering section that renders pixels of an image according to the pixel value in the pixel value data sequence of the synthesized image and the number of pixels of pixel value to be repeated or according to the pixel value, the number of pixels of pixel value to be repeated, the reference pixel, and the number of pixels of reference pixel to be repeated, and that renders the information about the transparency of the image by arranging coefficients according to the coefficient in the transparency data sequence and the number of pixels of the coefficient to be repeated or according to the coefficient, the number of pixels of the coefficient to be repeated, the reference coefficient, and the number of pixels of reference coefficient to be repeated.

4. The image forming apparatus as claimed in claim 1, wherein the image generation unit comprises:

a pixel value output section that outputs a pixel value on a per-pixel basis according to the pixel value in the pixel value data sequence and the number of pixels of pixel value to be repeated;

a pixel value acquisition section that acquires a pixel value on a per-pixel basis from the pixel value arrangement data according to the reference pixel in the pixel value data sequence;

an image generation section that generates an image from the pixel values output from the pixel value output section and the pixel values acquired by the pixel value acquisition section;

a coefficient output section that outputs the coefficient for each pixel according to the coefficient in the transparency element data sequence and the number of pixels of the coefficient to be repeated;

a coefficient acquisition section that acquires a coefficient for each pixel from the coefficient arrangement data according to the reference coefficient in the transparency element data sequence; and a coefficient generation section that generates information about the transparence of the image from the coefficient output by the coefficient output section and the coefficient acquired from the coefficient acquisition section.

5. The image forming apparatus as claimed in claim 1, wherein the image generation unit subjects the image generated from the pixel value data sequence to image processing which uses the information about the transparence of the image generated from the transparency data sequence.

6. An image processing apparatus comprising:

a holding unit that holds a transparency data sequence which expresses an image element as an aggregation of one-dimensional data sequences and in which each of the one-dimensional data sequences is formed by a coefficient representing transparency of a pixel value in the image element, a number of pixels of the coefficient to be repeated, and attribute information of the coefficient, or by the coefficient, the number of pixels of the coefficient to be repeated, reference to a reference coefficient corresponding to coefficient arrangement data pertaining to the coefficient held in a predetermined data holding unit, and a number of pixels of the reference coefficient to be repeated;

a generation unit that generates a transparency data sequence of a synthesized image by sequentially synthesizing the transparency data sequences pertaining to a plurality of image elements; and a processing unit that subjects the synthesized image to image processing which uses the transparency data sequence of the synthesized image generated by the generation unit, wherein the processing unit comprises:

a coefficient output section that outputs a coefficient for each pixel according to the coefficient in the transparency element data sequence and the number of pixels of the coefficient to be repeated;

a coefficient acquisition section that acquires a coefficient for each element from the coefficient arrangement data according to the reference coefficient in the transparency data sequence; and a coefficient arrangement section that imparts the coefficient output from the coefficient output section and the coefficient acquired from the coefficient acquisition section to each of the pixels of the synthesized image arranged on memory.

7. The image processing apparatus as claimed in claim 6, wherein the processing unit generates information about transparency of the entire synthesized image on a per-pixel basis by arranging coefficients according to the coefficient in the transparency data sequence of the synthesized image and the number of pixels of the coefficient to be repeated or according to the coefficient, the number of pixels of the coefficient to be repeated, the reference coefficient, and the number of pixels of the reference coefficient to be repeated; and imparts the generated information about the transparency to each of the pixels of the synthesized image.

8. An image processing apparatus comprising:

a holding unit that holds pixel value data undergoing run length encoding by use of a pixel value of a pixel constituting an image element and transparency data undergoing run length encoding by use of a coefficient representing the transparency of the pixel, the holding unit holding a transparency data sequence in which each of the one-dimensional data sequences is formed by a coefficient representing transparency of a pixel value in the image element, a number of pixels of the coefficient to be repeated, and attribute information of coefficient, or by the coefficient, the number of pixels of the coefficient to be repeated, reference to a reference coefficient corresponding to coefficient arrangement data pertaining to the coefficient held in the predetermined data holding unit, and a number of pixels of the reference coefficient to be repeated;

a first generation unit that generates pixel value data pertaining to a synthesized image formed by synthesis of a plurality of image elements, by synthesizing the pixel value data pertaining to the plurality of image elements;

a second generation unit that generates transparency data pertaining to a synthesized image formed by synthesis of the plurality of image elements, by synthesizing the transparency data pertaining to the plurality of image elements;

a first expansion unit that expands pixel value data pertaining to the synthesized image;

a second expansion unit that expands transparency data pertaining to the synthesized image; and a processing unit that imparts each of the pixels of the synthesized image represented by the expanded pixel value data with the coefficient of a pixel of interest in the synthesized image represented by the expanded transparency data.

9. A non-transitory computer readable medium storing a program causing a computer to execute a process for performing an alpha blending, the process comprising:

receiving data pertaining to an image including at least one of image elements;

generating a pixel value data sequence representing the image element as an aggregation of one-dimensional data sequences and in which each of the data sequences is formed by a pixel value, a number of pixels of the pixel value to be repeated, and attribute information of the pixel value, or by the pixel value, the number of pixels of the pixel value to be repeated, reference to a reference pixel corresponding to an image value arrangement data stored in a predetermined data holding unit, and a number of pixels of the reference pixel to be repeated; and generating a transparency data sequence representing the image element as an aggregation of one-dimensional data sequences and in which each of the one-dimensional data sequences is formed by a coefficient representing transparency of a pixel value in the image element, a number of pixels of the coefficient to be repeated, and attribute information of the coefficient, or by the coefficient, the number of pixels of the coefficient to be repeated, reference to a reference coefficient corresponding to coefficient arrangement data pertaining to the coefficient held in the predetermined data holding unit, and a number of pixels of the reference coefficient to be repeated; and generating a pixel value data sequence of a synthesized image by sequentially synthesizing the pixel value data sequence for each image element and the transparency data sequence for each image element, and generating a transparency data sequence of the synthesized image by sequentially synthesizing the transparency data sequence for each image element.

10. A non-transitory computer readable medium storing a program causing a computer to execute a process for performing an alpha blending, the process comprising:

receiving data pertaining to an image including at least one of image elements, and generating a transparency data sequence which represents the image element as an aggregation of one-dimensional data sequences and in which each of the one-dimensional data sequences is formed by a coefficient representing transparency of a pixel value in the image element, a number of pixels of the coefficient to be repeated, and attribute information of the coefficient, or by the coefficient, the number of pixels of the coefficient to be repeated, reference to a reference coefficient corresponding to coefficient arrangement data pertaining to the coefficient held in a predetermined data holding unit, and a number of pixels of the reference coefficient to be repeated;

sequentially synthesizing the transparency data sequence pertaining to the plurality of image elements, to thus generate transparency data pertaining to a synthesized image; and subjecting the synthesized image to image processing using the transparency data sequence of the synthesized image, wherein the image processing comprises:

outputting a coefficient for each pixel according to the coefficient in the transparency element data sequence and the number of pixels of the coefficient to be repeated;

acquiring a coefficient for each element from the coefficient arrangement data according to the reference coefficient in the transparency data sequence; and imparting the coefficient for each pixel and the coefficient for each element to each of the pixels of the synthesized image arranged on memory.

* * * * *